United States Patent
Udatsu et al.

(10) Patent No.: US 9,737,848 B2
(45) Date of Patent: Aug. 22, 2017

(54) CARBON DIOXIDE CAPTURE SYSTEM AND METHOD OF OPERATING CARBON DIOXIDE CAPTURE SYSTEM

(71) Applicant: KABUSHIKI KAISHA TOSHIBA, Minato-ku (JP)

(72) Inventors: Mitsuru Udatsu, Kawasaki (JP); Masatoshi Hodotsuka, Saitama (JP); Hideo Kitamura, Katsushika (JP); Kiyohiko Iwasa, Yokohama (JP); Keita Nagano, Kawasaki (JP); Noriko Chiba, Yokohama (JP); Yusuke Handa, Ota (JP); Satoshi Saito, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 5 days.

(21) Appl. No.: 14/971,158

(22) Filed: Dec. 16, 2015

(65) Prior Publication Data
US 2016/0346725 A1 Dec. 1, 2016

(30) Foreign Application Priority Data

May 26, 2015 (JP) .................. 2015-106408

(51) Int. Cl.
*B01D 53/00* (2006.01)
*B01D 53/14* (2006.01)
(Continued)

(52) U.S. Cl.
CPC ....... *B01D 53/1425* (2013.01); *B01D 53/002* (2013.01); *B01D 53/1412* (2013.01);
(Continued)

(58) Field of Classification Search
CPC ........ B01D 2252/103; B01D 2252/204; B01D 2252/504; B01D 2257/504;
(Continued)

(56) References Cited

U.S. PATENT DOCUMENTS

2010/0322842 A1 12/2010 Iijima et al.
2011/0135550 A1 6/2011 Nagayasu et al.
(Continued)

FOREIGN PATENT DOCUMENTS

EP 2 514 509 A1 10/2012

OTHER PUBLICATIONS

Office Action issued on Sep. 2, 2016 in Australian Patent Application No. 2015272010.
(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

A carbon dioxide capture system includes: a washing unit which uses cleaning water to clean absorption unit exhaust gas or stripping unit exhaust gas; and a gas-liquid separation device which allows condensed water generated by cooling washing unit exhaust gas to be separated from the washing unit exhaust gas. The condensed water is mixed into the cleaning water by a condensed water line. If the amount of the cleaning water becomes more than a predetermined amount, the cleaning water is mixed into an absorbing liquid by a cleaning water line. A controller controls a condensed water valve.

11 Claims, 6 Drawing Sheets

(51) Int. Cl.
*B01D 53/18* (2006.01)
*F23J 15/04* (2006.01)

(52) U.S. Cl.
CPC ..... *B01D 53/1418* (2013.01); *B01D 53/1475* (2013.01); *B01D 53/1493* (2013.01); *B01D 53/18* (2013.01); *F23J 15/04* (2013.01); *B01D 2252/103* (2013.01); *B01D 2252/204* (2013.01); *B01D 2252/504* (2013.01); *B01D 2257/504* (2013.01); *B01D 2258/0283* (2013.01); *Y02C 10/04* (2013.01); *Y02C 10/06* (2013.01); *Y02E 20/326* (2013.01)

(58) Field of Classification Search
CPC .......... B01D 2258/0283; B01D 53/002; B01D 53/1412; B01D 53/1418; B01D 53/1425; B01D 53/1475; B01D 53/1493; B01D 53/18; F23J 15/04
See application file for complete search history.

(56) References Cited

U.S. PATENT DOCUMENTS

| | | |
|---|---|---|
| 2011/0168020 A1 | 7/2011 | Baburao et al. |
| 2012/0263627 A1* | 10/2012 | Fujita ................. B01D 53/1475 422/119 |
| 2013/0291717 A1 | 11/2013 | Nagayasu et al. |
| 2013/0315809 A1 | 11/2013 | Shimamura |
| 2013/0333559 A1 | 12/2013 | Nakagawa |
| 2014/0086811 A1 | 3/2014 | Saito et al. |
| 2014/0127102 A1 | 5/2014 | Okuno et al. |

OTHER PUBLICATIONS

Extended European Search Report issued on Oct. 26, 2016 in Patent Application No. 15200170.7.

* cited by examiner

CARBON DIOXIDE CAPTURE SYSTEM AND METHOD OF OPERATING CARBON DIOXIDE CAPTURE SYSTEM

CROSS-REFERENCE TO RELATED APPLICATIONS

This application is based upon and claims the benefit of priority from Japanese Patent Application No. 2015-106408, filed May 26, 2015; the entire contents of which are incorporated herein by reference.

FIELD

Embodiments described herein relate to a carbon dioxide capture system and a method of operating a carbon dioxide capture system.

BACKGROUND

In recent years, a carbon dioxide capture and storage (CCS) technology for capturing and storing carbon dioxide ($CO_2$) has been drawing attention as a countermeasure against global warming. Specifically, there has been investigated a carbon dioxide capture system that uses an absorbing liquid to capture carbon dioxide contained in process exhaust gas (gas to be treated) discharged from a thermal power plant, a steel plant, or a garbage incineration plant.

In such a carbon dioxide capture system, the process exhaust gas is supplied to an absorber. In an absorption unit in the absorber, carbon dioxide contained in the process exhaust gas is absorbed in an absorbing liquid which contains amine and water. In this case, the process exhaust gas having released the carbon dioxide therefrom is discharged as absorption unit exhaust gas. The absorbing liquid having absorbed the carbon dioxide therein is supplied to a stripper. In a stripping unit in the stripper, the carbon dioxide is released from the absorbing liquid. The released carbon dioxide is discharged from the stripper together with steam as stripping unit exhaust gas, and the carbon dioxide is separated and captured. The absorbing liquid having released the carbon dioxide therefrom in the stripper is returned into the absorber.

Meanwhile, the absorption unit exhaust gas and the stripping unit exhaust gas can contain the amine used as a component of the absorbing liquid. As a measure to reduce the amount of the amine contained in the absorption unit exhaust gas and the stripping unit exhaust gas, it has been contemplated to cool the exhaust gases or wash the exhaust gases with water.

When the absorption unit exhaust gas or stripping unit exhaust gas is cooled, water contained in the exhaust gas is condensed to form condensed water. In this instance, the amine having been contained in the exhaust gas is absorbed in the condensed water. When the absorption unit exhaust gas or stripping unit exhaust gas is washed with water (cleaning water), the amine having been contained in the exhaust gas is absorbed in the cleaning water. Thus, in either case, the amount of the amine contained in the absorption unit exhaust gas or stripping unit exhaust gas can be reduced.

On the other hand, the condensed water or cleaning water in which the amine has been absorbed is mixed into the absorbing liquid circulating between the absorber and the stripper. By this process, the amine contained in the absorption unit exhaust gas or stripping unit exhaust gas is recovered. Accordingly, the loss of amine through discharge from the carbon dioxide capture system to the exterior of the system, called amine loss, can be suppressed.

In general, during an operation of the carbon dioxide capture system, the amount of water in the absorbing liquid circulating between the absorber and the stripper is held within a predetermined range. With the amount of water in the absorbing liquid made to be lower than a predetermined upper limit, the concentration of the absorbing liquid component is raised so as to enhance the carbon dioxide capture rate. On the other hand, when the concentration of the absorbing liquid component rises, the amount of the amine contained in the absorption unit exhaust gas or stripping unit exhaust gas can increase. In view of this, the amount of water in the absorbing liquid is set higher than a predetermined lower limit, so as to reduce the amine loss.

If the condensed water or cleaning water in which the amine has been absorbed as aforementioned is mixed into the absorbing liquid containing a large amount of water, therefore, the amount of water in the absorbing liquid can increase significantly. In such a case, it would be difficult for the amount of water in the absorbing liquid to be held within the aforementioned predetermined range.

DETAILED DESCRIPTION

Figure 1:
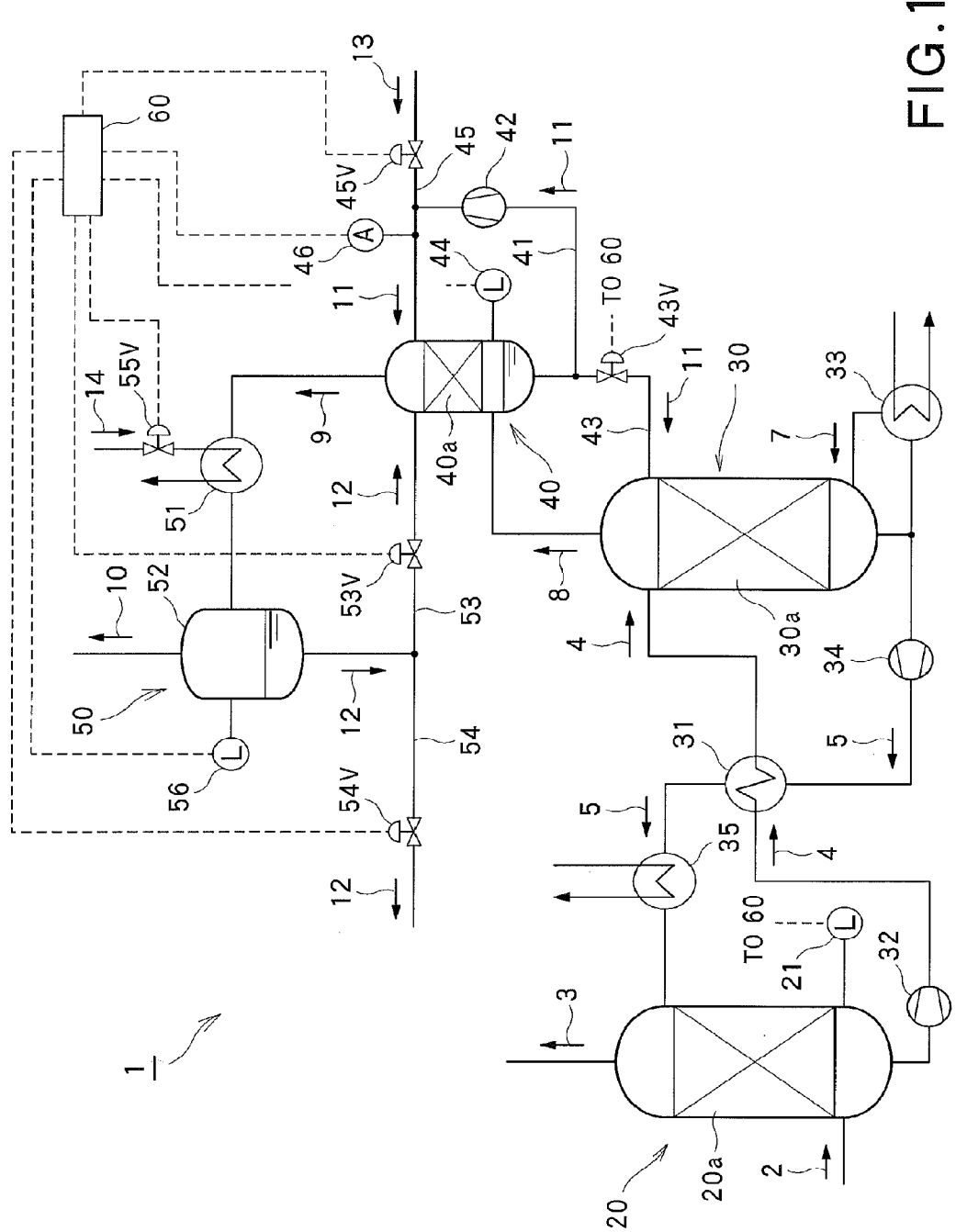
FIG. 1 is a diagram illustrating an overall configuration of a carbon dioxide capture system according to a first embodiment.

A carbon dioxide capture system according to each embodiment includes an absorber and a stripper. The absorber has an absorption unit which causes carbon dioxide contained in exhaust gas to be treated to be absorbed in an absorbing liquid containing water. The stripper has a stripping unit which allows the carbon dioxide to be released from the absorbing liquid supplied from the absorber and containing the carbon dioxide. The carbon dioxide capture system also includes a washing unit and a gas-liquid separation device. The washing unit uses cleaning water to clean absorption unit exhaust gas discharged from the absorption unit of the absorber or stripping unit exhaust gas discharged from the stripping unit of the stripper. The gas-liquid separation device cools the washing unit exhaust gas discharged from the washing unit to generate condensed water, and separates the generated condensed water from the washing unit exhaust gas. The condensed water is mixed into the cleaning water by a condensed water line. If the amount of the cleaning water is more than a predetermined amount, the cleaning water is mixed into the absorbing liquid by a cleaning water line. The amount of water contained in the absorbing liquid is measured by an absorbing liquid water amount gauge. The condensed water line includes a condensed water valve which regulates the amount of the condensed water to be mixed. A controller controls the condensed water valve so that the opening degree of the condensed water valve is increased if the amount of water contained in the absorbing liquid measured by the absorbing liquid water amount gauge is not more than a predetermined lower limit and that the opening degree of the condensed water valve is decreased if the amount of water contained in the absorbing liquid is not less than a predetermined upper limit.

Besides, a carbon dioxide capture system operating method according to each embodiment is a method of capturing carbon dioxide in a carbon dioxide capture system that includes an absorber and a stripper. The absorber has an absorption unit which causes carbon dioxide contained in exhaust gas to be treated to be absorbed in a water-containing absorbing liquid. The stripper has a stripping unit which allows the carbon dioxide to be released from the absorbing liquid supplied from the absorber and containing the carbon dioxide. In the carbon dioxide capture system operating method, absorption unit exhaust gas discharged from the absorption unit of the absorber or stripping unit exhaust gas discharged from the stripping unit of the stripper is washed with cleaning water in a washing unit. Washing unit exhaust gas discharged from the washing unit is cooled to generate condensed water, and the generated condensed water is separated from the washing unit exhaust gas. Besides, the amount of water contained in the absorbing liquid is measured. The condensed water separated from the washing unit exhaust gas is mixed into the cleaning water. If the amount of the cleaning water becomes more than a predetermined amount, the cleaning water is mixed into the absorbing liquid. At the time of mixing the condensed water into the cleaning water, the amount of the condensed water to be mixed is increased if the measured amount of water contained in the absorbing liquid is not more than a predetermined lower limit, and the amount of the condensed water to be mixed is decreased if the amount of water contained in the absorbing liquid is not less than a predetermined upper limit.

A carbon dioxide capture system and carbon dioxide capture system operating method according to each embodiment of the present invention will now be described with reference to the accompanying drawings.

First Embodiment

First, a carbon dioxide capture system and carbon dioxide capture system operating method according to a first embodiment of the invention will be described with reference to FIG. 1.

As depicted in FIG. 1, a carbon dioxide capture system 1 includes an absorber (absorption column) 20 and a stripper (regeneration column) 30. The absorber 20 causes carbon dioxide contained in process exhaust gas 2 (a gas to be treated) to be absorbed in an absorbing liquid which contains water. The stripper 30 allows the carbon dioxide to be released from the absorbing liquid having absorbed the carbon dioxide and being supplied from the absorber 20, and thereby regenerates the absorbing liquid. The process exhaust gas 2 having had the carbon dioxide absorbed in the absorbing liquid in the absorber 20 is discharged from the absorber 20 as absorption unit exhaust gas 3. In addition, the carbon dioxide is discharged from the stripper 30 together with steam as stripping unit exhaust gas 8. The kind of the process exhaust gas 2 supplied to the absorber 20 is not limited to any particular one, but may be exhaust gas discharged from a thermal power plant, a steel plant, a garbage incineration plant or the like. Such exhaust gas is supplied to the absorber 20 by a blower (not shown), and may be supplied to the absorber 20 after being subjected to a cooling process as required.

The absorbing liquid circulates between the absorber 20 and the stripper 30. The absorbing liquid absorbs carbon dioxide to turn into a rich liquid 4 in the absorber 20 and releases the carbon dioxide to turn into a lean liquid 5 in the stripper 30. The absorbing liquid may preferably be, but is not limited to, an aqueous solution of an amine such as monoethanolamine and diethanolamine. Besides, the absorbing liquid may be an aqueous solution of more than one amine.

The absorber 20 has an absorption unit 20a (packed bed or tray) accommodated in the absorber 20. The absorption unit 20a causes the process exhaust gas 2 and the lean liquid 5 to make contact with each other so that the carbon dioxide contained in the process exhaust gas 2 is absorbed in the lean liquid 5. The absorber 20 is configured to accept the process exhaust gas 2 via a lower portion thereof and discharge absorption unit exhaust gas 3 via a top portion thereof. The absorber 20a is configured as a countercurrent gas-liquid contact device.

An absorbing liquid level gauge 21 (absorbing liquid water amount gauge) is provided at a lower portion of the absorber 20 to measure the amount of water contained in the rich liquid 4 stored in the absorber 20. More specifically, the absorbing liquid level gauge 21 measures liquid level of the rich liquid 4 stored in the absorber 20. When the measured liquid level of the rich liquid 4 is high, the amount of water contained in the rich liquid 4 can be considered as large, and when the liquid level is low, the amount of water in the rich liquid 4 can be considered as small.

The process exhaust gas 2 supplied into the lower portion of the absorber 20 ascends toward the absorption unit 20a within the absorber 20. On the other hand, the lean liquid 5 from the stripper 30 diffuses and falls, to be supplied into the absorption unit 20a. In the absorption unit 20a, the process exhaust gas 2 and the lean liquid 5 make gas-liquid contact with each other, whereby the carbon dioxide contained in the process exhaust gas 2 is absorbed in the lean liquid 5, to generate a rich liquid 4.

The rich liquid 4 thus generated is temporarily stored in the lower portion of the absorber 20 and discharged from the bottom portion. The process exhaust gas 2 having made contact with the lean liquid 5 and been deprived of the carbon dioxide is discharged from the absorption unit 20a, ascends within the absorber 20, and is discharged from a top portion of the absorber 20 as absorption unit exhaust gas 3.

A heat exchanger 31 is provided between the absorber 20 and the stripper 30. A rich liquid pump 32 is provided between the absorber 20 and the heat exchanger 31. The rich liquid 4 discharged from the absorber 20 is supplied to the stripper 30 through the heat exchanger 31 by the rich liquid pump 32. The heat exchanger 31 brings the rich liquid 4 being supplied from the absorber 20 to the stripper 30 into heat exchange with the lean liquid 5 being supplied from the stripper 30 to the absorber 20. This allows the lean liquid 5 to serve as a heat source, by which the rich liquid 4 is heated up to a desired temperature. In other words, the rich liquid 4 serves as a cold source, by which the lean liquid 5 is cooled down to a desired temperature.

The stripper 30 has a stripping unit 30a (a packed bed or tray) which is accommodated in the stripper 30 and allows carbon dioxide to be released from the rich liquid 4. The stripping unit 30a is configured as a countercurrent gas-liquid contact device.

A reboiler 33 is connected to the stripper 30. The reboiler 33 is configured so that the lean liquid 5 supplied from the stripper 30 is heated by a heating medium to generate steam 7, and the generated steam 7 is supplied to the absorber 30. More specifically, the reboiler 30 is supplied with part of the lean liquid 5 discharged from a bottom portion of the stripper 30, and, simultaneously, is supplied with high-temperature steam as a heating medium from an external component or equipment, for example, a boiler (not shown). The lean liquid 5 supplied to the reboiler 33 is heated through heat exchange with the heating medium, whereby steam 7 is generated from the lean liquid 5. In this instance, carbon dioxide may also be released from the lean liquid 5. The generated steam 7 is supplied to a lower portion of the stripper 7 together with the carbon dioxide, to heat the rich liquid 4 within the stripper 30, whereby the temperature of the rich liquid 4 is raised. The heating medium is not limited to the high-temperature steam.

The steam 7 supplied into the lower portion of the stripper 30 ascends toward the stripping unit 30a within the stripper 30. On the other hand, the rich liquid 4 from the absorber 20 diffuses and falls, to be supplied to the stripping unit 30a. In the stripping unit 30a, the rich liquid 4 and the steam 7 make contact with each other, whereby the carbon dioxide is released from the rich liquid 4, resulting in formation of the lean liquid 5. In this way, the absorbing liquid is regenerated in the stripper 30.

The regenerated lean liquid 5 is discharged from a bottom portion of the stripper 30. On the other hand, the steam 7 having made contact with the rich liquid 4 is discharged from a top portion of the stripper 30 as stripping unit exhaust gas 8.

A lean liquid pump 34 is provided between the stripper 30 and the heat exchanger 31. The lean liquid 5 discharged from the stripper 30 is supplied to the absorber 20 through the heat exchanger 31 by the lean liquid pump 34. As aforementioned, the heat exchanger 31 causes the lean liquid 5 being supplied from the stripper 30 to the absorber 20 to be cooled through heat exchange with the rich liquid 4 being supplied from the absorber 20 to the stripper 30. Besides, a lean liquid cooler 35 which cools the lean liquid 5 being supplied from the stripper 30 (more specifically, from the heat exchanger 31) to the absorber 20 is provided between the heat exchanger 31 and the absorber 20. The lean liquid cooler 35 is supplied with a cooling medium, such as cooling water, from an external component or equipment. By the lean liquid cooler 35, the lean liquid 5 cooled in the heat exchanger 31 is further cooled to a desired temperature.

The lean liquid 5 cooled by the lean liquid cooler 35 is supplied to the absorption unit 20a of the absorber 20. In the absorption unit 20a, the lean liquid 5 makes contact with the process exhaust gas 2 so as to absorb carbon dioxide contained in the process exhaust gas 2, thereby turning into the rich liquid 4. In this manner, in the carbon dioxide capture system 1, the absorbing liquid circulates while repeating the state of being the lean liquid 5 and the state of being the rich liquid 4.

The carbon dioxide capture system 1 shown in FIG. 1 further includes a washing column 40 and a gas-liquid separation device 50. The washing column 40 uses cleaning water 11 to clean the stripping unit exhaust gas 8 discharged from a top portion of the stripper 30. The gas-liquid separation device 50 cools washing unit exhaust gas 9 discharged from the washing column 40 to generate condensed water 12.

In this first embodiment, the washing column 40 is provided as a separate body from the stripper 30. The washing column 40 has a washing unit 40a (a packed bed or tray) which is accommodated in the washing column 40 and configured to bring the stripping unit exhaust gas 8 and the cleaning water 11 into contact with each other, thereby washing the stripping unit exhaust gas 8 with the cleaning water 11. Thus, in the present embodiment, the washing unit 40a is provided in the washing column 40 which is a separate body from the stripper 30. The washing column 40 is configured to accept the stripping unit exhaust gas 8 via a lower portion thereof and discharge the washed stripping unit exhaust gas 8 as the washing unit exhaust gas 9 via a top portion thereof. The washing unit 40a is configured as a countercurrent gas-liquid contact device. The cleaning water 11 is not limited to any particular kind, but may be water, for example.

A circulation line 41 through which to circulate the cleaning water 11 is connected to the washing column 40. Specifically, the circulation line 41 is provided with a circulation pump 42, by which the cleaning water 11 stored in a lower portion of the washing column 40 is drawn out and supplied to an upper portion of the washing column 40. The circulation line 41 is not provided with any cooler for cooling the cleaning water 11. Therefore, the stripping unit exhaust gas 8 is discharged as the washing unit exhaust gas 9 while retaining its high temperature. On the other hand, through the heat exchange between the high-temperature stripping unit exhaust gas 8 and the cleaning water 11, the cleaning water 11 is heated to attain a temperature comparable to or slightly lower than the temperature of the stripping unit exhaust gas 8.

Besides, a bottom portion of the washing column 40 is connected to an upper portion of the stripper 30 through a cleaning water line 43. By the cleaning water line 43, the cleaning water 11 in the washing column 40 is mixed into the rich liquid 4 in the stripper 30. In the embodiment illustrated in FIG. 1, that portion of the cleaning water line 43 which is on the washing column 40 side is formed integrally with the circulation line 41.

In addition, the cleaning water line 43 includes a cleaning water valve 43V which regulates the amount of the cleaning water 11 to be mixed. On the other hand, the washing column 40 is provided with a cleaning water level gauge 44 (cleaning water amount gauge) which measures the amount of the cleaning water 11. The cleaning water level gauge 44 measures water level of the cleaning water 11 stored in the washing column 40. When the measured water level of the cleaning water 11 is high, the amount of the cleaning water 11 can be considered as large, and when the water level is low, the amount of the cleaning water 11 can be considered as small. The aforementioned cleaning water valve 43 is opened and closed by a controller 60 described later, whereby the cleaning water line 43 can mix the cleaning water 11 into the rich liquid 4 when the amount of the cleaning water 11 in the washing column 40 becomes more than a predetermined amount. The cleaning water line 43 is not limited to the configuration including the cleaning water valve 43V, so long as the cleaning water line 43 can mix the cleaning water 11 into the rich liquid 4 when the amount of the cleaning water 11 becomes more than the predetermined amount.

In the configuration as above, the stripping unit exhaust gas 8 supplied to a lower portion of the washing column 40 ascends toward the washing unit 40*a* within the washing column 40. On the other hand, the cleaning water 11 from the circulation line 41 is supplied into an upper portion of the washing column 40, and diffuses and falls toward the washing unit 40*a*. In the washing unit 40*a*, the stripping unit exhaust gas 8 and the cleaning water 11 make contact with each other, whereby the stripping unit exhaust gas 8 is cleaned, and the amine contained in the stripping unit exhaust gas 8 is dissolved and absorbed in the cleaning water 11. The cleaning water 11 having absorbed the amine flows downward from the washing unit 40*a*, to be stored in a lower portion of the washing column 40. The cleaning water 11 stored in the lower portion of the washing column 40 is again supplied to the washing unit 40*a* by the circulation line 41. In this way, the cleaning water 11 circulates. In addition, the cleaning water 11 stored in the lower portion of the washing column 40 is supplied also to the stripper 30 in the case where the cleaning water valve 43V is open, to be mixed into the rich liquid 4 in the stripper 30.

On the other hand, the stripping unit exhaust gas 8 having been washed with the cleaning water 11 in the washing unit 40*a* is discharged from the washing unit 40*a* and ascends to be discharged from a top portion of the washing column 40, as the washing unit exhaust gas 9. Since the washing unit exhaust gas 9 is washed with the cleaning water 11 as aforementioned, the concentration of the amine in the washing unit exhaust gas 9 can be lowered.

As illustrated in FIG. 1, a pure water line 45 is connected to the circulation line 41. This ensures that pure water 13 is supplied from the pure water line 45 into the circulation line 41, and the pure water 13 is mixed into the cleaning water 11. The pure water line 45 includes a pure water valve 45V which regulates the amount of the pure water 13 to be mixed. Besides, the circulation line 41 is provided with a cleaning water concentration gauge 46 which measures the concentration of amine in the cleaning water 11 flowing through the circulation line 41. The cleaning water concentration gauge 46, preferably, measures a physical property value having correlation with the concentration of amine in the cleaning water 11, such as the specific gravity of the cleaning water 11 and the hydrogen ion concentration (pH) of the cleaning water 11.

The gas-liquid separation device 50 in this first embodiment includes a condensing cooler 51 and a gas-liquid separator 52. The condensing cooler 51 cools the washing unit exhaust gas 9 discharged from the washing column 40 to condense water contained in the washing unit exhaust gas 9, thereby generating condensed water. The gas-liquid separator 52 separates the generated condensed water from the washing unit exhaust gas 9. The condensing cooler 51 is supplied with a cooling liquid 14 for cooling the washing unit exhaust gas 9, from an external component or equipment. The washing unit exhaust gas 9 from which the condensed water 12 has been separated in the gas-liquid separator 52 is discharged as carbon dioxide gas 10, to be supplied to equipment (not shown) for storage or the like. On the other hand, the condensed water 12 separated in the gas-liquid separator 52 is discarded and/or supplied to the washing column 40.

In other words, the gas-liquid separator 52 is connected with a condensed water line 53 and a discard line 54. The condensed water line 53 is connected to an upper portion of the washing column 40 so as to supply the condensed water 12 from the gas-liquid separator 52 to the washing unit 40*a*, thereby mixing the condensed water 12 into the cleaning water 11. In addition, the condensed water line 53 includes a condensed water valve 53V which regulates the amount of the condensed water 12 to be mixed. The discard line 54 discards (discharges to the exterior) the condensed water 12 from the gas-liquid separator 52. Besides, the discard line 54 includes a discard valve 54V which regulates the amount of the condensed water 12 to be discarded. In the embodiment illustrated in FIG. 1, that portion of the condensed water line 53 which is on the gas-liquid separator 52 side and that portion of the discard line 54 which is on side of the gas-liquid separator 52 are integrally formed.

Furthermore, the gas-liquid separation device 50 includes a cooling liquid valve 55A and a condensed water level gauge 56 (condensed water amount gauge). The cooling liquid valve 55V regulates the amount of the cooling liquid 14 to be supplied to the condensing cooler 51 so as to cool the washing unit exhaust gas 9. The condensed water level gauge 56 measures the amount of the condensed water 12 in the gas-liquid separator 52. The condensed water level gauge 56 measures water level of the condensed water 12 stored in the gas-liquid separator 52. When the measured water level of the condensed water 12 is high, the amount of the condensed water 12 can be considered as large, and when the water level is low, the amount of the condensed water 12 can be considered as small.

Each of the aforementioned valves 43V, 45V, 53V, 54V, and 55V is controlled by the controller 60.

First, based on the amount of water in the rich liquid 4 measured by the absorbing liquid level gauge 21, the controller 60 controls the opening degrees of the condensed water valve 53V and the discard valve 54V. More specifically, if the amount of water in the rich liquid 4 is not more than a predetermined lower limit, the controller 60 increases the opening degree of the condensed water valve 53V and decreases the opening degree of the discard valve 54V. On the other hand, if the amount of water in the rich liquid 4 is not less than a predetermined upper limit, the controller 60 decreases the opening degree of the condensed water valve 53V. In the first embodiment, the liquid level of the rich liquid 4 measured by the absorbing liquid level gauge 21 is transmitted as a signal to the controller 60. In the case where the liquid level of the rich liquid 4 is not more than a predetermined lower limit, the controller 60 judges that the amount of water in the rich liquid 4 is not more than a predetermined lower limit. In the case where the liquid level of the rich liquid 4 is not less than a predetermined upper limit, on the other hand, the controller 60 judges that the amount of water in the rich liquid 4 is not less than a predetermined upper limit.

In addition, the controller 60 controls the opening and closing of the cleaning water valve 43V, based on the amount of the cleaning water 11 measured by the cleaning water level gauge 44. More specifically, the controller 60 opens the cleaning water valve 43V if the amount of the cleaning water 11 is more than a predetermined amount, and closes the cleaning water valve 43V if the amount of the cleaning water 11 is less than a predetermined amount. In the first embodiment, the water level of the cleaning water 11 measured by the cleaning water level gauge 44 is transmitted as a signal to the controller 60. In the case where the water level of the cleaning water 11 is higher than a predetermined value, the controller 60 judges that the amount of the cleaning water 11 is more than a predetermined amount. In the case where the water level of the cleaning water 11 is lower than a predetermined value, the controller 60 judges that the amount of the cleaning water 11 is less than a predetermined amount.

Besides, the controller 60 controls the opening and closing of the pure water valve 45V, based on the amount of water in the rich liquid 4 measured by the absorbing liquid level gauge 21. More specifically, in the case where the amount of water in the rich liquid 4 is not more than a predetermined lower limit, the controller 60 opens the pure water valve 45V. In addition, the opening and closing of the pure water valve 45V may also be controlled based on the concentration of amine in the cleaning water 11 measured by the cleaning water concentration gauge 46. More specifically, the concentration of amine in the cleaning water 11 measured by the cleaning water concentration gauge 46 is transmitted as a signal to the controller 60. The controller 60 opens the pure water valve 45V if the concentration of amine in the cleaning water 11 is higher than a predetermined concentration, and closes the pure water valve 45V if the concentration of amine in the cleaning water 11 is lower than a predetermined concentration.

Further, the controller 60 as above controls the opening degree of the cooling liquid water valve 55V, based on the amount of the condensed water 12 measured by the condensed water level gauge 56. More specifically, the controller 60 decreases the opening degree of the cooling liquid valve 55V if the amount of the condensed water 12 is more than a predetermined amount, and increases the opening degree of the cooling liquid valve 55V if the amount of the condensed water is less than a predetermined amount. In this first embodiment, the water level of the condensed water 12 measured is transmitted as a signal to the controller 60. In the case where the water level of the condensed water 12 is higher than a predetermined value, the controller 60 judges that the amount of the condensed water 12 is more than a predetermined amount. In the case where the water level of the condensed water 12 is lower than a predetermined value, the controller 60 judges that the amount of the condensed water 12 is less than a predetermined amount.

An operation of this embodiment configured as above, that is, a method of operating the carbon dioxide capture system will now be described. The following operating method is carried out through control of each of the regulating valves 43V, 45V, 53V, 54V and 55V by the aforementioned controller 60.

During an operation of the carbon dioxide capture system 1, as illustrated in FIG. 1, the stripping unit exhaust gas 8 discharged from the stripper 30 is washed with the cleaning water 11 in the washing unit 40a of the washing column 40, to be discharged from the washing column 40 as the washing unit exhaust gas 9. Since the washing unit exhaust gas 9 has been washed with the cleaning water 11, its amine concentration can be lowered as compared with that of the stripping unit exhaust gas 8.

The washing unit exhaust gas 9 discharged is cooled by the condensing cooler 51 of the gas-liquid separation device 50, whereby water contained in the washing unit exhaust gas 9 is condensed to generate the condensed water 12. Here, in the washing column 40, the cleaning water 11 is not cooled. For this reason, the washing unit exhaust gas 9 is little cooled and retains a high temperature before being supplied to the condensing cooler 51, where it is cooled. Accordingly, the amount of the condensed water 12 generated at the condensing cooler 51 can be increased.

The washing unit exhaust gas 9 thus cooled is supplied to the gas-liquid separator 52, where the condensed water 12 is separated from the washing unit exhaust gas 9. The washing unit exhaust gas 9 from which the condensed water 12 has been separated is discharged from the gas-liquid separator 52 as the carbon dioxide gas 10. On the other hand, the condensed water 12 separated as above is stored in the gas-liquid separator 52. Since the condensed water 12 thus stored is generated by condensation of the washing unit exhaust gas 9 having a lowered amine concentration, the amine concentration of the condensed water 12 can be lowered. Since the condensed water 12 generated can absorb the amine which can be contained in the washing unit exhaust gas 9, the amine concentration of the washing unit exhaust gas 9 can further be lowered.

During the operation, the liquid level of the rich liquid 4 stored in the absorber 20 is being measured by the absorbing liquid level gauge 21 provided at the absorber 20. In normal conditions, the liquid level of the rich liquid 4 is set within a predetermined range (to be higher than a predetermined lower limit and lower than a predetermined upper limit). In this case, the condensed water valve 53V and the discard valve 54V are set to predetermined opening degrees. This ensures that from the gas-liquid separator 52, a predetermined quantity of the condensed water 12 is being supplied through the condensed water line 53 into the washing column 40 to be mixed into the cleaning water 11, and a predetermined quantity of the condensed water 12 is being discarded through the discard line 54. Since the amine concentration of the condensed water 12 can be lowered as aforementioned, amine loss due to discarding through the condensed water 12 is suppressed, so that discarding cost can be lowered.

Here, first, a case where the amount of water in the absorbing liquid is not more than a predetermined lower limit, that is, a case where the liquid level of the rich liquid 4 is not more than a predetermined lower limit, will be described.

In this case, the opening degree of the condensed water valve 53V is set greater (than a predetermined opening degree in the aforementioned normal conditions). As a result, the amount of the condensed water 12 to be supplied to the washing column 40 increases, and the amount of the condensed water 12 to be mixed into the cleaning water 11 within the washing column 40 increases. When the amount of the condensed water 12 to be mixed increases, the water level of the cleaning water 11 stored in the washing column 40 rises, to be higher than a predetermined value. Since the condensed water 12 having a lowered amine concentration is mixed into the cleaning water 11, the amine concentration of the cleaning water 11 can be lowered. Consequently, the cleaning performance of the cleaning water 11 can be increased, and amine recovery factor can be enhanced.

During the operation, the water level of the cleaning water 11 stored in the washing column 40 is being measured by the cleaning water level gauge 44 provided at the washing column 40. When the water level rises above a predetermined value, the cleaning water valve 43V is opened. As a result, the cleaning water 11 is supplied from a bottom portion of the washing column 40 through the cleaning water line 43 to an upper portion of the stripper 30. Consequently, the cleaning water 11 is mixed into the rich liquid 4 in the stripper 30, whereby the amount of water in the rich liquid 4 can be increased.

Meanwhile, the pure water valve 45V may be opened if the liquid level of the rich liquid 4 still remains at or below a predetermined lower limit notwithstanding the amount of the rich liquid 4 has been increased in the aforementioned manner. This operation causes the pure water 13 to be supplied from the pure water line 45 into the circulation line 41 and mixed into the cleaning water 11. Consequently, the water level of the cleaning water 11 stored in the washing column 40 can be raised, and the cleaning water 11 can be mixed into the rich liquid 4 in the stripper 30. In this case also, the pure water is mixed into the cleaning water 11, so that the amine concentration of the cleaning water 11 can be lowered.

When the amount of the rich liquid 4 increases, the liquid level of the rich liquid 4 stored in the absorber 20 rises, so that the liquid level can be made to be higher than a predetermined lower limit. Consequently, the amount of water in the rich liquid 4 can be set to within a predetermined range.

During the operation, the water level of the condensed water 12 stored in the gas-liquid separator 52 is being measured by the condensed water level gauge 56 provided at the gas-liquid separator 52. When this liquid level has fallen below a predetermined value, the opening degree of the cooling liquid valve 55V is set greater (than an opening degree in normal conditions). This operation increases the amount of the cooling liquid 14 to be supplied to the condensing cooler 51, thereby increasing the cooling performance of the condensing cooler 51. Accordingly, the amount of the condensed water 12 generated in the condensing cooler 51 is increased, whereby the water level of the condensed water 12 stored in the gas-liquid separator 52 can be raised.

In addition, when the liquid level of the condensed water 12 in the gas-liquid separator 52 has fallen below a predetermined value, the opening degree of the discard valve 54V may be set smaller (than a predetermined opening degree in the aforementioned normal conditions). By this operation, the amount of the condensed water 12 to be discarded can be reduced, so that the liquid level of the condensed water 12 in the gas-liquid separator 52 can be raised.

Now, a case where the amount of water in the absorbing liquid is not less than a predetermined upper level, namely, a case where the liquid level of the rich liquid 4 is not less than a predetermined upper limit, will be described.

In this case, the opening degree of the condensed water valve 53V is set smaller (than a predetermined opening degree in the aforementioned normal conditions). This operation reduces the amount of the condensed water 12 to be mixed into the cleaning water 11. When the amount of the condensed water 12 to be mixed is reduced, the water level of the cleaning water 11 stored in the washing column 40 falls below a predetermined value.

When the water level of the cleaning water 11 falls below the predetermined value, the cleaning water valve 43V is closed. By this operation, an increase in the amount of water in the rich liquid 4 can be prevented, and the liquid level of the rich liquid 4 stored in the absorber 20 can be lowered. Accordingly, the liquid level can be lowered below a predetermined upper limit, so that the amount of water in the rich liquid 4 can be set to within a predetermined range. In addition, with the cleaning water valve 43V closed, a situation in which the cleaning water 11 cannot be circulated due to a reduction in the amount of the cleaning water 11 can be avoided, and an amount of the cleaning water 11 required for cleaning the stripping unit exhaust gas 8 can be secured.

When the water level of the condensed water 12 in the gas-liquid separator 52 has risen above a predetermined value, the opening degree of the discard valve 54V may be set greater (than a predetermined opening degree in the aforementioned normal conditions). This operation increases the amount of the condensed water 12 to be discarded, whereby the water level of the condensed water 12 in the gas-liquid separator 52 can be lowered.

Besides, when the liquid level of the condensed water in the gas-liquid separator 52 has risen above a predetermined value, the opening degree of the cooling liquid valve 55V may be set smaller (than an opening degree in normal conditions). By this operation, the amount of the cooling liquid 14 to be supplied into the condensing cooler 51 is reduced, whereby the amount of the condensed water 12 generated in the condensing cooler 51 can be reduced. Therefore, the water level of the condensed water 12 stored in the gas-liquid separator 52 can be lowered. In this case, the steam contained in the washing unit exhaust gas 9 is discharged to the exterior in the state of being contained in the carbon dioxide gas 10.

During when the opening degree of the condensed water valve 53V is reduced, the amount of the condensed water 12 into the cleaning water 11 is reduced, so that the amine concentration of the cleaning water 11 can increase. In this case, the cleaning performance of the cleaning water 11 may drop.

Meanwhile, during the operation, the amine concentration of the cleaning water 11 flowing through the circulation line 41 is measured by the cleaning water concentration gauge 46 provided in the circulation line 41. When the amine concentration rises above a predetermined concentration, the opening degree of the condensed water valve 53V is increased, for example, back to a predetermined opening degree in normal conditions. This operation increases the amount of the condensed water 12 to be mixed into the cleaning water 11, whereby the cleaning performance of the cleaning water 11 can be restrained from dropping due to a rise in amine concentration. When the amine concentration of the cleaning water 11 has risen above a predetermined concentration, the pure water valve 45V may be opened to mix pure water 13 into the cleaning water 11. In this case also, a lowering in cleaning performance can be restrained.

Thus, according to this first embodiment, when the liquid level of the rich liquid 4 in the absorber 20 is not more than a predetermined lower limit, the amount of the condensed water 12 to be mixed into the cleaning water 11 from the gas-liquid separator 52 is increased. This operation increases the amount of the cleaning water in the washing column 40. When the amount of water has become more than a predetermined amount, the cleaning water 11 in the washing column 40 is mixed into the rich liquid 4 in the stripper 30. Therefore, the amount of water in the rich liquid 4 can be increased, and the liquid level of the rich liquid 4 can be set higher than a predetermined lower limit. As a result, the amount of water in the absorbing liquid can be controlled appropriately.

In addition, according to this embodiment, the stripping unit exhaust gas 8 discharged from the stripper 30 is washed with the cleaning water 11 in the washing unit 40a. By this operation, the amine contained in the stripping unit exhaust gas 8 as an absorbing liquid component can be recovered, so that the amine can be restrained from being discharged to the exterior while being contained in the washing unit exhaust gas 9. In particular, according to this embodiment, the washing unit exhaust gas 9 discharged from the washing unit 40a is cooled in the condensing cooler 51 of the gas-liquid separation device 50, and the condensed water 12 is separated in the gas-liquid separator 52. Since the amine which can be contained in the washing unit exhaust gas 9 can be absorbed in this condensed water 12, the amine can be recovered, so that the amine loss can be further reduced.

The first example above describes an example in which the cleaning water line 43 is connected to an upper portion of the stripper 30. However, the cleaning water line 43 may be connected, as desired, to the absorber 20 or to that line of the rich liquid 4 or the lean liquid 5 which is provided between the absorber 20 and the stripper 30, so long as the cleaning water 11 can be mixed into the rich liquid 4 or the lean liquid 5.

In addition, the first embodiment describes an example in which the pure water line 45 is connected to the circulation line 41. However, this is not restrictive, and, for example, the pure water line 45 may be connected to the washing column 40, so long as the pure water 13 can be mixed into the cleaning water 11.

Besides, the first embodiment describes an example in which the absorbing liquid water amount gauge is the absorbing liquid level gauge 21 configured to measure the liquid level of the rich liquid 4 stored in the absorber 20. However, this is not limitative. For instance, the absorbing liquid level gauge 21 may be configured to measure the liquid level of the lean liquid 5 stored in the stripper 30. In addition, the absorbing liquid water amount gauge may measure a physical property value having correlation with the concentration of amine in the absorbing liquid (the rich liquid 4 or the lean liquid 5), such as the specific gravity of the absorbing liquid and the hydrogen ion concentration (pH) of the absorbing liquid, and the amount of water may be obtained by calculation from the physical property value measured.

Figure 2:
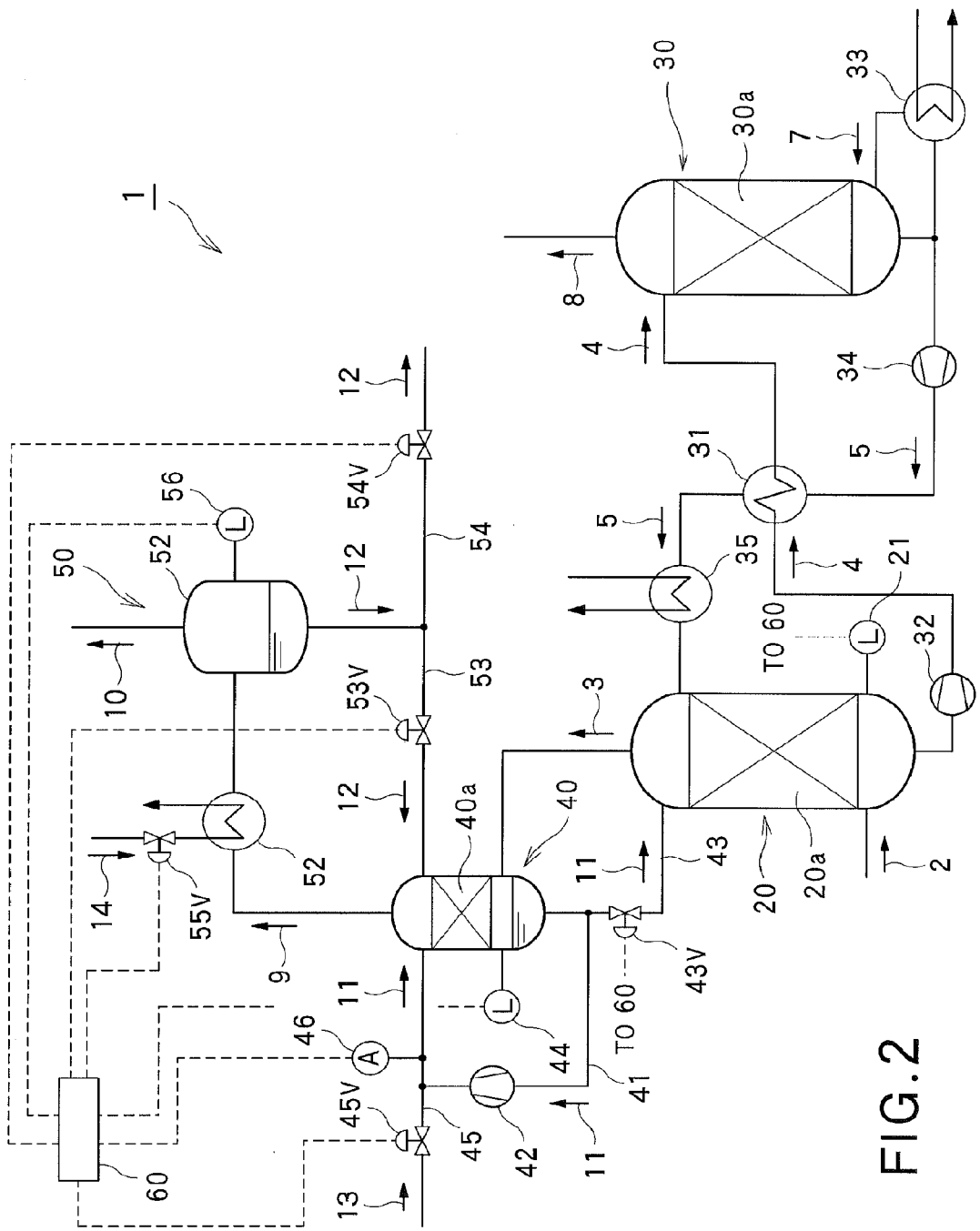
FIG. 2 is a diagram illustrating a modification of FIG. 1.

Furthermore, the first embodiment describes an example in which the stripping unit exhaust gas 8 discharged from the stripper 30 is supplied to the washing column 40 to be washed with the cleaning water 11. This, however, is not restrictive. For example, as shown in FIG. 2, the absorption unit exhaust gas 3 discharged from the absorber 20 may be supplied to the washing column 40 to be washed with the cleaning water 11. In this case also, the amount of water in the absorbing liquid can be controlled appropriately, and the amine contained in the absorption unit exhaust gas 3 can be recovered, thereby suppressing the amine loss.

Second Embodiment

A carbon dioxide capture system and carbon dioxide capture system operating method according to a second embodiment of the invention will now be described with reference to FIG. 3.

Figure 3:
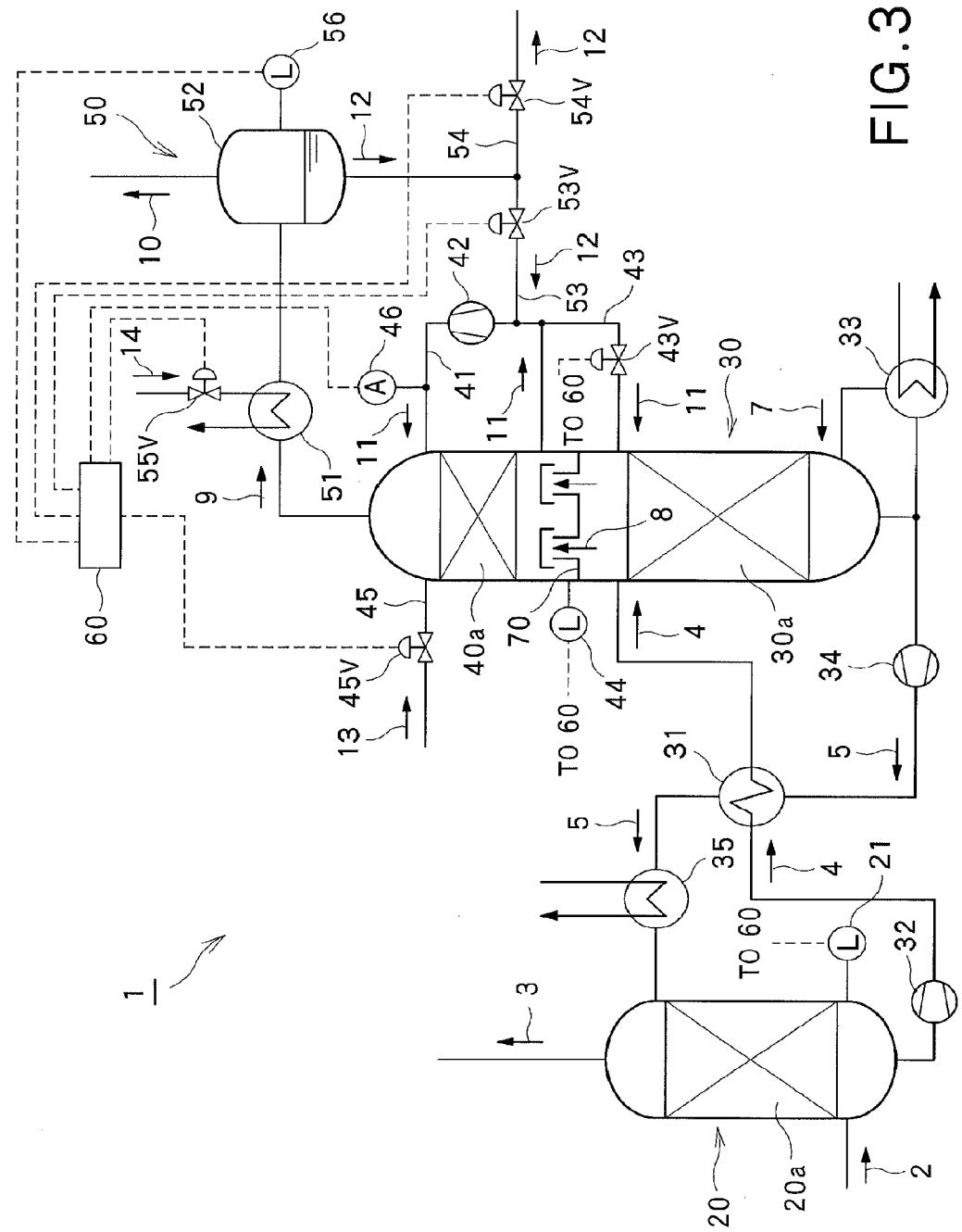
FIG. 3 is a diagram illustrating an overall configuration of a carbon dioxide capture system according to a second embodiment.

In the second embodiment illustrated in FIG. 3, a washing unit is provided above a stripping unit within a stripper. This feature is mainly different from that in the first embodiment, but other configurations are substantially the same as those in the first embodiment illustrated in FIG. 1. Parts that are illustrated in FIG. 3 and the same as those in the first embodiment illustrated in FIG. 1 are denoted by the same reference numerals and symbols as those in the first embodiment illustrated in FIG. 1, and a detailed description thereof is omitted.

As illustrated in FIG. 3, in this second embodiment, a washing unit 40a is not provided in the washing column 40 (see FIG. 1) provided as a separate body from the stripper 30 but is provided within the stripper 30. The washing unit 40a is arranged above the stripping unit 30a within the stripper 30.

A collector 70 (cleaning water storage unit) configured to store cleaning water 11 flowing downward from the washing unit 40a is provided between the stripping unit 30a and the washing unit 40a. A circulation line 41 through which to circulate the cleaning water 11 draws out the cleaning water 11 stored in the collector 70, and supplies the cleaning water 11 to the upper side of the washing unit 40a. The cleaning water 11 supplied to the upper side of the washing unit 40a diffuses and falls, to be supplied to the washing unit 40a. A cleaning water level gauge 44 is configured to measure water level of the cleaning water 11 stored in the collector 70. In this second embodiment also, the circulation line 41 is not provided with any cooler for cooling the cleaning water 11.

A pure water line 45 is connected to an upper portion of the stripper 30. Pure water 13 is supplied from the pure water line 45 to an upper portion of the stripper 30, and is mixed into the cleaning water 11 within the stripper 30.

A condensed water line 53 is connected to the circulation line 41. This allows condensed water 12 from a gas-liquid separator 52 to be supplied to the circulation line 41, to be mixed into the cleaning water 11.

Thus, according to the second embodiment, the washing unit 40a configured to wash or clean stripping unit exhaust gas 8 is provided within the stripper 30. With this structure, the need for providing a washing column 40 as a separate body from the stripper 30 can be eliminated. Therefore, the carbon dioxide capture system 1 can be simplified in configuration, and its production cost can be reduced.

The second embodiment describes an example in which the washing unit 40a in a single stage is provided in the stripper 30. However, this is not restrictive. Two or more stages of washing units 40a may be provided within the stripper 30. In this case, the amine concentration of washing unit exhaust gas 9 can be further lowered.

Third Embodiment

A carbon dioxide capture system and carbon dioxide capture system operating method according to a third embodiment of the invention will now be described with reference to FIG. 4.

Figure 4:
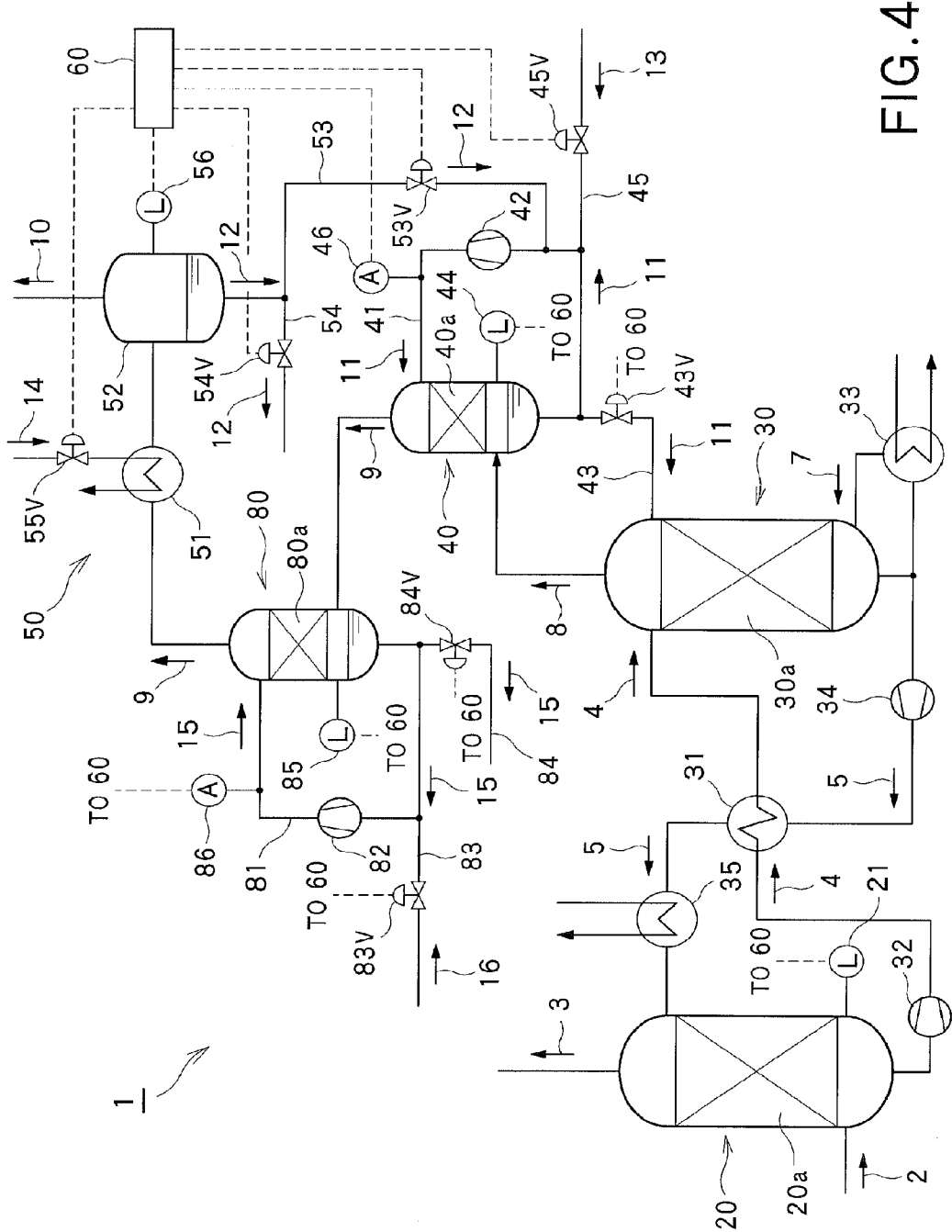
FIG. 4 is a diagram illustrating an overall configuration of a carbon dioxide capture system according to a third embodiment.

In the third embodiment illustrated in FIG. 4, a second washing unit is provided between a washing unit and a gas-liquid separator. This feature is mainly different from that in the first embodiment, but other configurations are substantially the same as those in the first embodiment. Parts that are illustrated in FIG. 4 and the same as those in the first embodiment illustrated in FIG. 1 are denoted by the same reference numerals and symbols as those in the first embodiment illustrated in FIG. 1, and a detailed description thereof is omitted.

As illustrated in FIG. 4, in the third embodiment, a second washing unit 80a is provided between a washing unit 40a and a gas-liquid separator 50. The second washing unit 80a uses second cleaning water 15 to clean washing unit exhaust gas 9 discharged from the washing unit 40a.

Specifically, a second washing column 80 is provided between the washing column 40 and a cooler 51 of a gas-liquid separation device 50. The second washing column 80 is provided as a separate body from the washing column 40. The second washing column 80 has the second washing unit 80a (a packed bed or tray) accommodated in the second washing column 80. The second washing unit 80a is configured to bring the washing unit exhaust gas 9, which is discharged from the washing unit 40a, into contact with the second cleaning water 15 so as to clean the washing unit exhaust gas 9 with the second cleaning water 15. In addition, the second washing column 80 is configured to accept the washing unit exhaust gas 15 via a lower portion thereof and discharge the washed washing unit exhaust gas 9 via a top portion thereof. Like the washing unit 40a, the second washing unit 80a is configured as a countercurrent gas-liquid contact device.

The second cleaning water 15 is an acidic solution. On the other hand, an amine or amines contained in the washing unit exhaust gas 9 are basic. This ensures that the second cleaning water 15 can have an enhanced amine absorbing performance as compared with a non-acidic solution such as water.

A second circulation line 81 through which to circulate the second cleaning water 15 is connected to the second washing column 80. Specifically, the second circulation line 81 is provided with a second circulation pump 82, and the second cleaning water 15 stored in a lower portion of the second washing column 80 is drawn out and supplied to an upper portion of the second washing column 80. The second cleaning water 15 supplied to the upper portion of the second washing column 80 diffuses and falls, to be supplied to the second washing unit 80a. The second circulation line 81 is not provided with any cooler for cooling the second cleaning water 15. Therefore, the washing unit exhaust gas 9 is discharged from the second washing column 80 while retaining its high temperature. On the other hand, the second cleaning water 15 is heated through heat exchange between the washing unit exhaust gas 9, which is at a high temperature, and the second cleaning water 15, to acquire a temperature comparable to or slightly lower than the temperature of the washing unit exhaust gas 9.

According to the configuration as above, the washing unit exhaust gas 9 supplied to the lower portion of the second washing column 80 ascends toward the second washing unit 80a within the second washing column 80. On the other hand, the second cleaning water 15 from the second circulation line 81 is supplied to an upper portion of the second washing column 80, and diffuses and falls toward the second washing unit 80a. In the second washing unit 80a, the washing unit exhaust gas 9 and the second cleaning water 15 make contact with each other, whereby the washing unit exhaust gas 9 is cleaned, and the amine which can be contained in the washing unit exhaust gas 9 is dissolved and absorbed in the second cleaning water 15. The second cleaning water 15 having absorbed the amine flows downward from the second washing unit 80a, to be stored in the lower portion of the second washing column 80. The second cleaning water 15 stored in the lower portion of the second washing column 80 is again supplied to the second washing unit 80a through the second circulation line 81. In this way, the second cleaning water 15 circulates.

On the other hand, the washing unit exhaust gas 9 having been washed with the second cleaning water 15 in the second washing unit 80a is discharged from the second washing unit 80a and ascends, to be discharged via a top portion of the second washing column 80. Since the washing unit exhaust gas 9 is cleaned with the second cleaning water 15 as aforementioned, the amine concentration of the washing unit exhaust gas 9 can be further lowered.

A crude liquid line 83 is connected to the second circulation line 81. A crude liquid 16 as an acidic solution is supplied from the crude liquid line 83 into the second circulation line 81, to be mixed into the second cleaning water 15. The crude liquid line 83 includes a crude liquid valve 83V configured to regulate the amount of the crude liquid 16 to be mixed. Besides, the crude liquid line 83 is provided with a second cleaning water concentration gauge 86 configured to measure acidic component concentration of the second cleaning water 15 flowing through the second circulation line 81. The second cleaning water concentration gauge 86, preferably, measures a physical property value having correlation with the concentration of acidic component(s) in the second cleaning water 15, such as the specific gravity of the second cleaning water 15 and the hydrogen ion concentration (pH) of the second cleaning water 15.

In addition, a second discard line 84 is connected to the second circulation line 81. The second discard line 84 is configured to discard the second cleaning water 15 from the second circulation line 81. Besides, the second discard line 84 includes a second discard valve 84V configured to regulate the amount of the second cleaning water 15 to be discarded.

The second washing column 80 is provided with a second cleaning water level gauge 85 configured to measure the amount of the second cleaning water 15. The second cleaning water level gauge 85 measures water level of the second cleaning water stored in the second washing column 80. When the water level of the second cleaning water 15 measured is high, the amount of the second cleaning water 15 can be considered as large, and when the water level is low, the amount of the second cleaning water 15 can be considered as small.

A controller 60 controls the opening and closing of the crude liquid valve 83V, based on the acidic component concentration of the second cleaning water 15 measured by the second cleaning water concentration gauge 86. More specifically, the acidic component concentration of the second cleaning water 15 measured by the second cleaning water concentration gauge 86 is transmitted as a signal to the controller 60. The controller 60 opens the crude liquid valve 83V if the acidic component concentration of the second cleaning water 15 is lower than a predetermined concentration, and closes the crude liquid valve 83V if the acidic component concentration of the second cleaning water 15 is not less than a predetermined concentration.

In addition, the controller 60 controls the opening and closing of the second discard valve 84V, based on the amount of the second cleaning water 15 measured by the second cleaning water level gauge 85. More specifically, the controller 60 opens the second discard valve 84V if the amount of the second cleaning water 15 is more than a predetermined amount, and closes the second discard valve 84V if the amount of the second cleaning water 15 is less than a predetermined value. In this third embodiment, the water level of the second cleaning water 15 measured by the second cleaning water level gauge 85 is transmitted as a signal to the controller 60. When the water level of the second cleaning water 15 is higher than a predetermined value, the controller 60 judges that the amount of the second cleaning water 15 is larger. When the water level of the second cleaning water 15 is lower than a predetermined value, the controller 60 judges that the amount of the second cleaning water 15 is smaller.

According to the configuration as above, in the case where the acidic component concentration of the second cleaning water 15 has fallen below a predetermined concentration, the crude liquid valve 83V is opened, so that the crude liquid 16 as an acidic solution is supplied from the crude liquid line 83 into the second circulation line 81, to be mixed into the second cleaning water 15. By this operation, the second cleaning water 15 is replenished with the acidic component(s) the amount of which has been reduced through a neutralization reaction with amine. As a result, the cleaning performance of the second cleaning water 15 can be increased, and amine recovery factor can be enhanced. On the other hand, in the case where the liquid amount of the second cleaning water 15 has increased through replenishment with the crude liquid 16 and the water level has risen above a predetermined value, the second discard valve 84V is opened. By this operation, the second cleaning water 15 in the second circulation line 81 is discarded through the second discard line 84, whereby the amount of the second cleaning water in the second washing column 80 can be reduced.

As illustrated in FIG. 4, a condensed water line 53 in this third embodiment is connected to a circulation line 41. With this structure, condensed water 12 from the gas-liquid separator 52 is supplied to the circulation line 41, to be mixed into cleaning water 11.

Thus, according to the third embodiment, the washing unit exhaust gas 9 is washed with the second cleaning water 15 which is an acidic solution. This ensures that if the washing unit exhaust gas 9 has an amine concentration lowered through washing in the washing unit 40a, the amine(s) which can be contained in the washing unit exhaust gas 9 can be absorbed in the second cleaning water 15, whereby the washing unit exhaust gas 9 can be cleaned further. Consequently, the amine(s) contained in the stripping unit exhaust gas 8 can be recovered more. Thus, discharge of the amine(s) to the exterior in the state of being contained in the washing unit exhaust gas 9 can be restrained more securely.

Fourth Embodiment

A carbon dioxide capture system and carbon dioxide capture system operating method according to a fourth embodiment of the invention will now be described with reference to FIG. 5.

Figure 5:
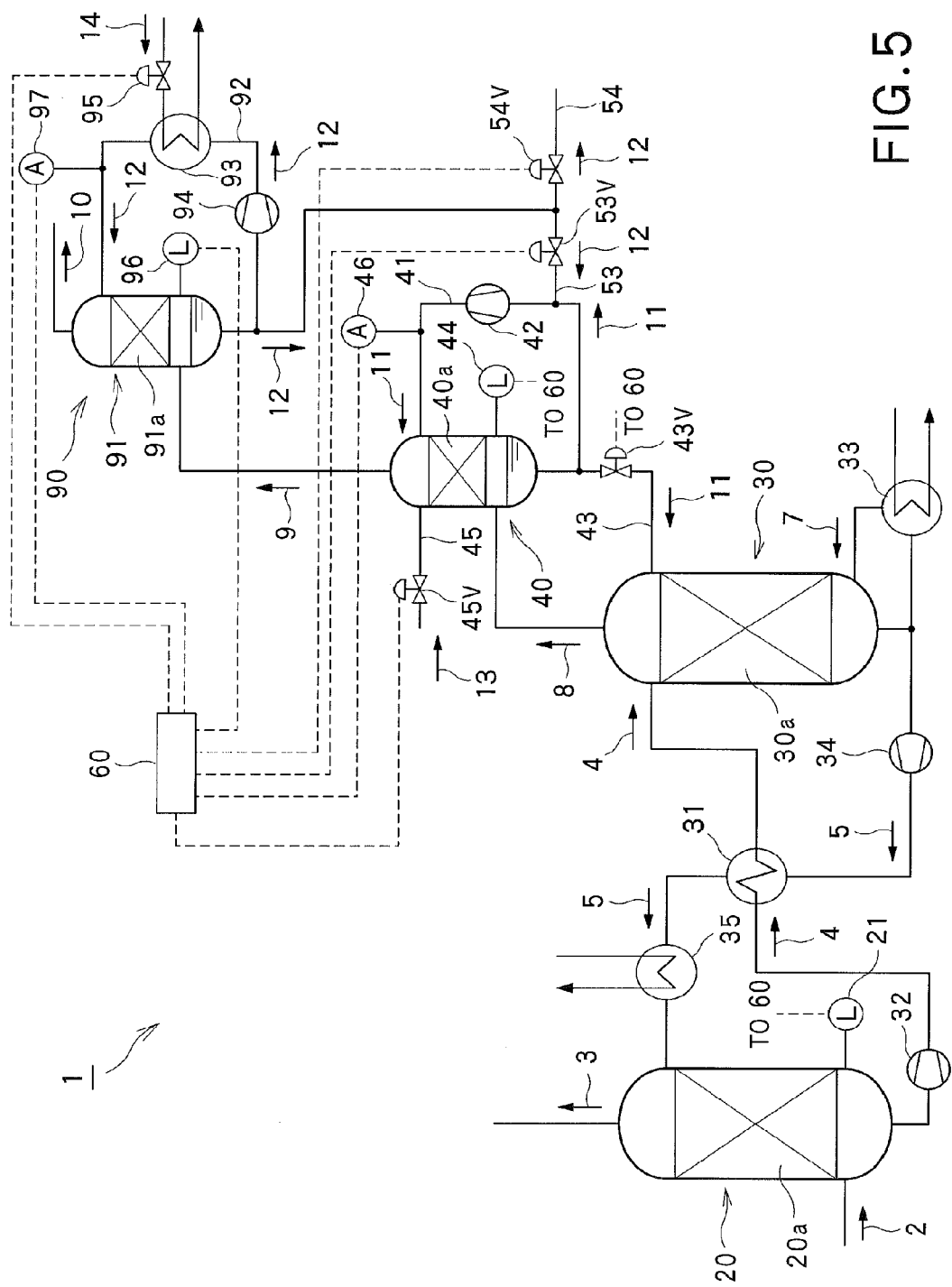
FIG. 5 is a diagram illustrating an overall configuration of a carbon dioxide capture system according to a fourth embodiment.

In the fourth embodiment as illustrated in FIG. 5, condensed water generated and separated from washing unit exhaust gas is cooled and the cooled condensed water is used to clean the washing unit exhaust gas. This feature is mainly different from that in the first embodiment, and other configurations are substantially the same as those in the first embodiment illustrated in FIG. 1. Parts illustrated in FIG. 5 and the same as those in the first embodiment illustrated in FIG. 1 are denoted by the same reference numerals and symbols as those in the first embodiment, and a detailed description thereof is omitted.

As illustrated in FIG. 5, a gas-liquid separation device 90 in the fourth embodiment includes a gas-liquid separator 91, a second circulation line 92, and a condensing cooler 93. The second circulation line 92 is configured to circulate condensed water 12 present in the gas-liquid separator 91. The condensing cooler 93 is provided in the second circulation line 92 to cool the condensed water 12. The gas-liquid separator 91 includes a gas-liquid separation unit 91a (a packed bed or tray) configured to bring washing unit exhaust gas 9 and the condensed water 12 into contact with each other, thereby cleaning the washing unit exhaust gas 9. The gas-liquid separator 91 is configured to accept the washing unit exhaust gas 9 via a lower portion thereof, and discharge the washed washing unit exhaust gas 9 as a carbon dioxide gas 10 via a top portion thereof. The gas-liquid separator 91a is configured as a countercurrent gas-liquid contact device.

The second circulation line 92 is connected to the gas-liquid separator 91, and is provided with a second circulation pump 94. By such a configuration as just mentioned, the second circulation line 92 draws out the condensed water 12 stored in a lower portion of the gas-liquid separator 91, and supplies the condensed water 12 to an upper portion of the gas-liquid separator 91. The condensed water 12 supplied to the upper portion of the gas-liquid separator 91 diffuses and falls, to be supplied to the gas-liquid separation unit 91a.

According to the configuration as above, the washing unit exhaust gas 9 supplied to the lower portion of the gas-liquid separator 91 ascends toward the gas-liquid separation unit 91a within the gas-liquid separator 91. On the other hand, the condensed water 12 from the second circulation line 92 is supplied to the upper portion of the gas-liquid separator 91 of the gas-liquid separation device 90, and diffuses and falls toward the gas-liquid separation unit 91a. In the gas-liquid separation unit 91a, the washing unit exhaust gas 9 and the condensed water 12 make contact with each other, whereby the washing unit exhaust gas 9 is cleaned, and the amine contained in the washing unit exhaust gas 9 is dissolved and absorbed in the condensed water 12.

Since the condensed water 12 is cooled by the condensing cooler 93, the washing unit exhaust gas 9 is cooled by the condensed water 12 within the gas-liquid separation unit 91a. By this process, water contained in the washing unit exhaust gas 9 is condensed, whereby the condensed water 12 is generated. The generated condensed water 12 is separated from the washing unit exhaust gas 9, and is mixed with the condensed water 12 having cleaned the washing unit exhaust gas 9. The mixed condensed water 12 flows downward from the gas-liquid separation unit 91a, to be stored in a lower portion of the gas-liquid separator 91. The condensed water 12 stored in the lower portion of the gas-liquid separator 91 is again supplied to the gas-liquid separation unit 91a through the second circulation line 92. In this way, the condensed water 12 circulates.

On the other hand, the washing unit exhaust gas 9 washed with the condensed water 12 in the gas-liquid separation unit 91a is discharged from the gas-liquid separation unit 91a and ascends, to be discharged via a top portion of the gas-liquid separator 91 of the gas-liquid separation device 90. Since the washing unit exhaust gas 9 is washed with the condensed water 12, the amine concentration of the washing unit exhaust gas 9 can be further reduced.

A condensed water line 53 and a discard line 54 are connected to a bottom portion of the gas-liquid separator 91. Of these lines, the condensed water line 53 is connected to a circulation line 41 for cleaning water 11. The condensed water 12 from the gas-liquid separator 91 of the gas-liquid separation device 90 is supplied to the circulation line 41, to be mixed into the cleaning water 11. In the embodiment illustrated in FIG. 5, that portion of the condensed water line 53 which is on the gas-liquid separator 91 side and that portion of the discard line 54 which is on the gas-liquid separator 91 side are formed to be integral with the second circulation line 92.

A pure water line 45 in the fourth embodiment is connected to an upper portion of the washing column 40. Pure water 13 is supplied from the pure water line 45 to an upper portion of the washing column 40, to be mixed into the cleaning water 11 within the washing column 40.

The second circulation line 92 is provided with a condensed water concentration gauge 97 configured to measure amine concentration of the condensed water 12 flowing through the second circulation line 92. The condensed water concentration gauge 97, preferably, measures a physical property value having correlation with the concentration of amine in the condensed water 12, such as the specific gravity of the condensed water 12 and the hydrogen ion concentration (pH) of the condensed water 12.

In addition, the gas-liquid separation device 90 includes a cooling liquid valve 95 and a condensed water level gauge 96. The cooling liquid valve 95 is configured to regulate the amount of a cooling liquid 14 which is supplied to the condensing cooler 93 to cool the condensed water 12. The condensed water level gauge 96 is configured to measure the amount of the condensed water 12 within the gas-liquid separator 91. The condensed water level gauge 96 measures water level of the condensed water 12 stored in the gas-liquid separator 91. When the measured water level of the condensed water 12 is high, the amount of the condensed water 12 can be considered as large. When the water level is low, the amount of the condensed water 12 can be considered as small.

A controller 60 controls the opening degree of the cooling liquid valve 95, based on the amount of the condensed water 12 measured by the condensed water level gauge 96. More specifically, the controller 60 decreases the opening degree of the cooling liquid valve 95 if the amount of the condensed water 12 is more than a predetermined amount, and increases the opening degree of the cooling liquid valve 95 if the amount of the condensed water 12 is less than a predetermined amount. In this fourth embodiment, the water level of the condensed water 12 measured is transmitted as a signal to the controller 60. When the water level of the condensed water 12 is higher than a predetermined value, the controller 60 judges that the amount of the condensed water 12 is more than a predetermined amount. When the water level of the condensed water 12 is lower than a predetermined value, the controller 60 judges that the amount of the condensed water 12 is less than a predetermined amount.

In addition, the controller 60 may control the opening degree of the cooling liquid valve 95 on the basis of the amine concentration of the condensed water 12 measured by the condensed water concentration gauge 97. In this case, the amine concentration of the condensed water 12 measured by the condensed water concentration gauge 97 is transmitted as a signal to the controller 60. If the amine concentration of the condensed water 12 is lower than a predetermined concentration, the controller 60 increases the opening degree of the cooling liquid valve 95. This operation increases the amount of the cooling liquid 14 to be supplied to the condensing cooler 93, whereby the condensed water 12 is cooled more. Therefore, the washing unit exhaust gas 9 is cooled more within the gas-liquid separation unit 91a, whereby the amount of the condensed water 12 generated can be increased and the amine concentration of the condensed water 12 can be lowered.

Thus, according to this fourth embodiment, the condensed water generated and separated from the washing unit exhaust gas 9 is cooled, and the cooled condensed water 12 is used to clean the washing unit exhaust gas 9. This operation ensures that if the washing unit exhaust gas 9 has an amine concentration lowered through cleaning in the washing unit 40a, the amine which can be contained in the washing unit exhaust gas 9 can be absorbed in the condensed water 12, whereby the washing unit exhaust gas 9 can be further cleaned. Consequently, the amine contained in a stripping unit exhaust gas 8 can be recovered more, and discharge of the amine to the exterior in the state of being contained in the washing unit exhaust gas 9 can be restrained more securely.

Fifth Embodiment

A carbon dioxide capture system and carbon dioxide capture system operating method according to a fifth embodiment of the invention will now be described with reference to FIG. 6.

Figure 6:
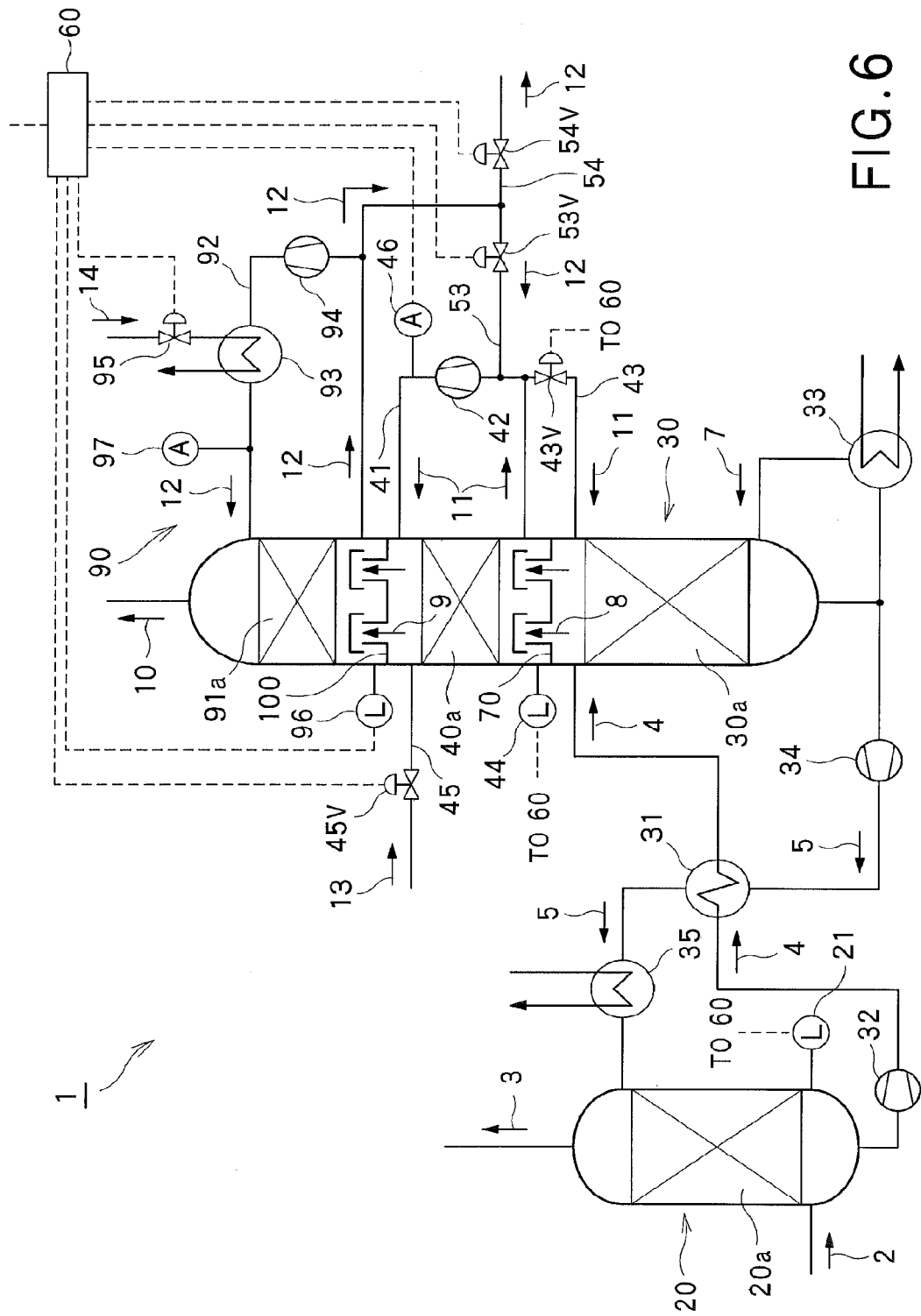
FIG. 6 is a diagram illustrating an overall configuration of a carbon dioxide capture system according to a fifth embodiment.

In the fifth embodiment illustrated in FIG. 6, a washing unit is provided above a stripping unit within a stripper and a gas-liquid contact unit is provided above the washing unit within the stripper. This feature is mainly different from that in the fourth embodiment and other configurations are substantially the same as those in the fourth embodiment illustrated in FIG. 5. Parts that are illustrated in FIG. 6 and the same as those in the fourth embodiment illustrated in FIG. 5 are denoted by the same reference numerals and symbols, and a detailed description thereof is omitted.

As illustrated in FIG. 6, in the fifth embodiment, a washing unit 40a is not provided in a washing column 40 (see FIG. 1) provided as a separate body from a stripper 30 but is provided in the stripper 30. The washing unit 40a is arranged above a stripping unit 30a within the stripper 30.

A collector 70 (cleaning water storage unit) configured to store cleaning water 11 flowing downward from the washing unit 40a is provided between the stripping unit 30a and the washing unit 40a. A circulation line 41 through which to circulate the cleaning water 11 is configured to draw out the cleaning water 11 stored in the collector 70 and supply the cleaning water 11 to an upper portion of the washing unit 40a. The cleaning water 11 supplied to the upper portion of the washing unit 40a diffuses and falls, to be supplied to the washing unit 40a. A cleaning water level gauge 44 is configured to measure water level of the cleaning water 11 stored in the collector 70. In this fifth embodiment also, the circulation line 41 is not provided with any cooler for cooling the cleaning water 11.

In addition, in this embodiment, a gas-liquid separation unit 91a is not provided in a gas-liquid separator 91 (see FIG. 5) provided as a separate body from the stripper 30 but is provided in the stripper 30. The gas-liquid separation unit 91a is disposed above the washing unit 40a within the stripper 30.

A second collector 100 in which to store condensed water 12 flowing downward from the gas-liquid separation unit 91a is provided between the washing unit 40a and the gas-liquid separation unit 91a. A second circulation line 92 through which to circulate the condensed water 12 is configured to draw out the condensed water 12 stored in the second collector 100 and supply the condensed water to the upper side of the gas-liquid separation unit 91a. The condensed water 12 supplied to the upper side of the gas-liquid separation unit 91a diffuses and falls, to be supplied to the gas-liquid separation unit 91a.

A pure water line 45 is connected to a portion between the washing unit 40a and the second collector 100, of the stripper 30. Pure water 13 is supplied from the pure water line 45 to that portion of the stripper 30, to be mixed into the cleaning water 11 within the stripper 30.

According to the fifth embodiment, the washing unit 40a for washing a stripping unit exhaust gas 8 is provided within the stripper 30. With this structure, it is possible to eliminate the need to provide a washing column 40 as a separate body from the stripper 30. Besides, the gas-liquid separation unit 91a by which the condensed water generated by cooling a washing unit exhaust gas 9 is separated from the washing unit exhaust gas 9 is provided within the stripper 30. With this structure, it is possible to eliminate the need to provide a gas-liquid separator 91 as a separate body from the stripper 30. Therefore, a carbon dioxide capture system 1 capable of further restraining the amine loss can be simplified in configuration, and its production cost can be reduced.

According to the embodiments described above, it is possible to reduce the loss of absorbing liquid component and to appropriately control the amount of the absorbing liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. A carbon dioxide capture system comprising:
an absorber having an absorption unit configured to cause carbon dioxide contained in exhaust gas to be treated to be absorbed in an absorbing liquid containing water;
a stripper having a stripping unit configured to allow the carbon dioxide to be released from the absorbing liquid containing the carbon dioxide, the absorbing liquid being supplied from the absorber;
a washing unit configured to use cleaning water to clean absorption unit exhaust gas discharged from the absorption unit of the absorber or stripping unit exhaust gas discharged from the stripping unit of the stripper;
a gas-liquid separation device configured to cool washing unit exhaust gas discharged from the washing unit to generate condensed water, and separate the generated condensed water from the washing unit exhaust gas;
a condensed water line configured to mix the condensed water into the cleaning water;
a cleaning water line configured to mix the cleaning water into the absorbing liquid when an amount of the cleaning water is more than a predetermined amount;
an absorbing liquid level gauge configured to measure liquid level of the absorbing liquid in the absorber or the stripper as an amount of water contained in the absorbing liquid; and
a controller,
wherein the condensed water line comprises a condensed water valve configured to regulate an amount of condensed water to be mixed, and
the controller controls the condensed water valve so that opening degree of the condensed water valve is increased when the amount of water contained in the absorbing liquid measured by the absorbing liquid level gauge is not more than a predetermined lower limit and that the opening degree of the condensed water valve is decreased when the amount of water contained in the absorbing liquid is not less than a predetermined upper limit.

2. The carbon dioxide capture system according to claim 1, further comprising
a cleaning water amount gauge configured to measure an amount of the cleaning water,
wherein the cleaning water line comprises a cleaning water valve configured to regulate an amount of the cleaning water to be mixed, and
the controller controls the cleaning water valve so that the cleaning water valve is opened when the amount of the cleaning water measured by the cleaning water amount gauge is more than a predetermined amount and that the cleaning water valve is closed when the amount of the cleaning water is less than a predetermined amount.

3. The carbon dioxide capture system according to claim 1, further comprising
a pure water line configured to mix pure water into the cleaning water,
wherein the pure water line comprises a pure water valve configured to regulate an amount of the pure water to be mixed, and
the controller controls the pure water valve so that the pure water valve is opened when an amount of water contained in the absorbing liquid measured by the absorbing liquid level gauge is not more than a predetermined lower limit.

4. The carbon dioxide capture system according to claim 1, further comprising
a discard line configured to discard the condensed water from the gas-liquid separation device,
wherein the discard line comprises a discard valve configured to regulate an amount of the condensed water to be discarded, and
the controller controls the discard valve so that opening degree of the discard valve is decreased when an amount of water contained in the absorbing liquid measured by the absorbing liquid level gauge is not more than a predetermined lower limit.

5. The carbon dioxide capture system according to claim 1,
wherein the washing unit is provided in a washing column provided as a separate body from the stripper and is configured to use the cleaning water to clean the stripping unit exhaust gas.

6. The carbon dioxide capture system according to claim 1,
wherein the washing unit is provided above the stripping unit within the stripper and is configured to use the cleaning water to clean the stripping unit exhaust gas.

7. The carbon dioxide capture system according to claim 1, further comprising
a second washing unit provided between the washing unit and the gas-liquid separation device and configured to use second cleaning water to clean the washing unit exhaust gas,
wherein the second cleaning water is an acidic solution.

8. The carbon dioxide capture system according to claim 1,
wherein the gas-liquid separation device comprises:
a condensing cooler configured to cool the washing unit exhaust gas to generate condensed water;
a cooling liquid valve configured to regulate an amount of cooling liquid to be supplied, the cooling liquid being supplied to the condensing cooler to cool the washing unit exhaust gas;
a gas-liquid separator configured to separate the generated condensed water from the washing unit exhaust gas; and
a condensed water gauge configured to measure an amount of the condensed water in the gas-liquid separator, and
the controller controls the cooling liquid valve so that opening degree of the cooling liquid valve is decreased when an amount of the condensed water measured by the condensed water gauge is more than a predetermined amount and that the opening degree of the cooling liquid valve is increased when an amount of the condensed water is less than a predetermined amount.

9. The carbon dioxide capture system according to claim 1,
wherein the gas-liquid separation device comprises:
a gas-liquid contact unit configured to cool the washing unit exhaust gas to generate condensed water, separate the generated condensed water from the washing unit exhaust gas and cause the separated condensed water to flow downward;

a circulation line configured to supply the condensed water having flowed downward at the gas-liquid contact unit to the gas-liquid contact unit so as to circulate the condensed water; and a condensing cooler provided in the circulation line to cool the condensed water.

10. The carbon dioxide capture system according to claim 1, wherein the gas-liquid separation device comprises:

a gas-liquid contact unit configured to cool the washing unit exhaust gas to generate condensed water, separate the generated condensed water from the washing unit exhaust gas and cause the separated condensed water to flow downward;

a circulation line configured to supply the condensed water having flowed downward at the gas-liquid contact unit to the gas-liquid contact unit so as to circulate the condensed water; and a condensing cooler provided in the circulation line to cool the condensed water, the washing unit is provided above the stripping unit within the stripper and is configured to use the cleaning water to clean the stripping unit exhaust gas, and the gas-liquid contact unit of the gas-liquid separation device is provided above the washing unit within the stripper.

11. A method of operating a carbon dioxide capture system for capturing carbon dioxide in the carbon dioxide capture system, the carbon dioxide capture system comprising an absorber having an absorption unit configured to cause carbon dioxide contained in exhaust gas to be treated to be absorbed in an absorbing liquid containing water, and a stripper having a stripping unit configured to allow the carbon dioxide to be released from the absorbing liquid containing the carbon dioxide, the absorbing liquid being supplied from the absorber, the method comprising:

cleaning, in a washing unit, absorption unit exhaust gas discharged from the absorption unit of the absorber or stripping unit exhaust gas discharged from the stripping unit of the stripper;

cooling washing unit exhaust gas discharged from the washing unit to generate condensed water and separating the generated condensed water from the washing unit exhaust gas;

measuring an amount of water contained in the absorbing liquid;

mixing the condensed water separated from the washing unit exhaust gas into the cleaning water; and mixing the cleaning water into the absorbing liquid when an amount of the cleaning water is more than a predetermined amount, wherein in the step of mixing the condensed water into the cleaning water, an amount of the condensed water to be mixed is increased if a measured amount of water contained in the absorbing liquid is not more than a predetermined lower limit, and the amount of the condensed water to be mixed is decreased if the measured amount of water contained in the absorbing liquid is not less than a predetermined upper limit.

* * * * *